L. P. BROTHERTON.
GUARDED SPRING TIRE.
APPLICATION FILED SEPT. 21, 1910.

1,005,406.

Patented Oct. 10, 1911.

WITNESSES:—
John Rogers
S. L. Cornell

INVENTOR.
BY Louis P. Brotherton

UNITED STATES PATENT OFFICE.

LOUIS P. BROTHERTON, OF LOS ANGELES, CALIFORNIA.

GUARDED SPRING-TIRE.

1,005,406.  Specification of Letters Patent.  Patented Oct. 10, 1911.

Application filed September 21, 1910. Serial No. 583,143.

*To all whom it may concern:*

Be it known that I, LOUIS P. BROTHERTON, a citizen of the United States, residing in Los Angeles, in the county of Los Angeles and State of California, have invented a new Guarded Spring-Tire, of which the following is a specification.

This invention relates to improvements in wheels, and more particularly to that class of wheels that are provided with spring tires.

It is an object of the invention to provide a wheel with a spring supported tire capable of taking the place of a rigid or an inflated tire of the common type.

It is a further object of the invention to provide a guarded spring supported tire for the wheel, the spring portion of the tire being inclosed within guarding means which do not interfere with the action of the tire.

With these, and other objects in view, the invention comprises the constructions, combinations, and arrangements of parts that will be hereinafter fully described and claimed.

Figure 1:
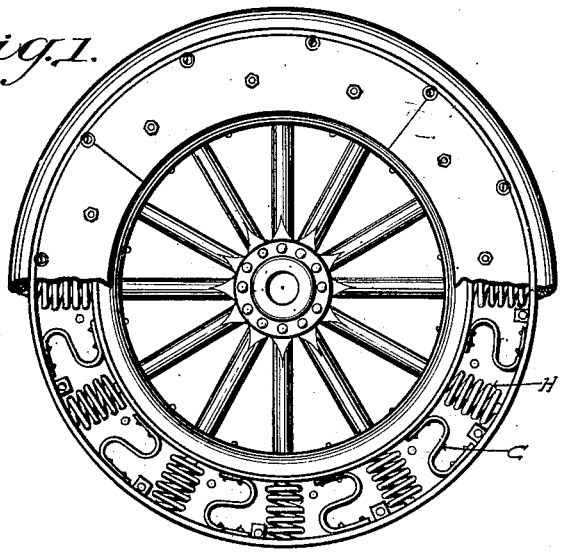
Figure 2:
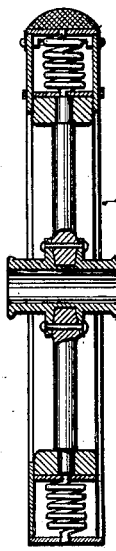
Figure 4:
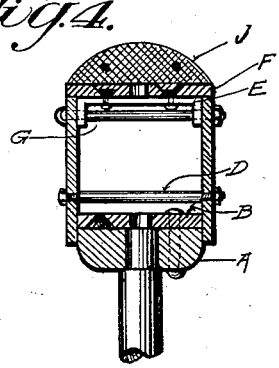
Figure 5:
Figure 3:
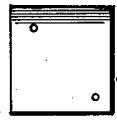
Figure 6:

In the accompanying drawing, Figure 1 is a side elevation of the improved wheel, a portion of the tire tread and the spring inclosing guard plates being broken away to reveal the arrangement and construction of the spring means inclosed within the tire. Fig. 2 is a central cross sectional view through the wheel, the yielding tread portion at the bottom being left off. Fig. 3 is a detail top plan view of one of the bent flat springs employed in the tire. Fig. 4 is an enlarged detailed sectional view through the tire portion of the wheel. Fig. 5 is a side elevation of a portion of the outer tire showing one of the side guard plates carried thereby. Fig. 6 is a detail view in front elevation of one of the flat springs of the tire.

In the drawing has been illustrated the preferred embodyment of the invention and the said invention will now be more particularly described, reference being had to said drawing.

The wheel forming the subject matter of the invention is provided with a hub, the spokes being of any desired construction, the outer ends of which are mortised into a felly A of the wheel. The felly A is usually of wood and of any ordinary construction. Upon the outer surface of the said felly A is an inner metallic tire B which is riveted or otherwise secured to the felly A. Spaced at a suitable distance outside of the tire B is an outer metallic tire F which is preferably made a little wider than the tire B and carries the side guard plates I, which will be hereinafter more fully described.

Interposed between the inner and outer tires B and F respectively are springs C and H. The springs C are preferably flat springs of approximately the width of the tire B, the said springs C are made of flat spring material bent into an approximately S-shape and having their inner ends riveted or bolted to the tire B as shown in Fig. 1 of the drawing. The outer ends of said flat springs are riveted or bolted to the outer tire F. The two tires are thus connected by resilient spring devices which allow for the cushioning action of the tire in using the wheel.

At suitable intervals, and preferably between the flat S springs C are arranged the coiled springs H. These coiled springs have their ends turned outwardly and they are inserted in holes bored in the outer and inner tires as clearly shown in Fig. 1 and Fig. 2. The springs thus set in position and having their ends engaging the apertures in the outer and inner tires cannot slip from place, and the coiled springs thus arranged add greatly to the resilient action of the wheel tire as a whole.

In order to guard the springs and the space between the tires, side guard plates are mounted upon the outer tire F and arranged to extend inwardly and to lap considerably upon the inner tire and the felly of the wheel. The space between the two tires is thus guarded against the entrance of dirt, gravel or foreign substances. The guard plates are held in position upon the outer tire F by means of brackets E which are riveted to the inner face of the outer tire F and have inturned ends which receive bolts G. The said bolts G pass through the ends of the brackets and through the guard plates upon each side of the wheel for rigidly holding the said guard plates in position just inside the edge of the outer tire F. The inner free portions of the guard plates are braced and held with respect to each other by means of bolts D which are set a sufficient distance away from the inner tire B not to strike the same when the tire is depressed under the weight of the wheel and its load. Ample space for the movement of the guard plates with respect to the felly A is thus allowed, and also the inner edges of said guard plates are held against spreading under the action of the felly.

The outer tire F is preferably provided with a yielding tread usually of rubber or some similar substance which is firmly fastened in place upon the outer tire F in any usual or desired manner.

It will be seen from this construction of the inner portion of the wheel that the felly and tire B is supported upon the flat and coiled springs and can move with respect to the guard plates so as to obtain the resilient action of said springs. The guard plates, however, while not interfering with the action of the springs in supporting the felly, close completely the space between the inner and outer tires so that dirt, sand, gravel, etc., cannot enter and cause damage. The said guard plates are preferably made up of a series of segmental plates placed end to end upon each side of the wheel as clearly shown in Fig. 1 of the drawing.

It will be noted that the bolts D are shouldered near their ends so as to prevent drawing together of the guard plates sufficiently to bind against the edges of the inner tire B and the felly A. The length of the shoulder portions of the bolts is just sufficient to brace the guard plates so as to have an easy movement with respect to the inner tire and felly.

What I claim is:—

A spring tire for vehicle wheels comprising an inner metallic rim secured to the felly of the wheel, an outer metallic rim spaced therefrom, flat springs connected at their outer and inner ends to said outer and inner rims, said rims having spring receiving apertures formed therein, coiled springs arranged between the rims having their ends inserted in said apertures, guard plates rigidly secured to the outer rim and extending inwardly over the inner rim so as to move with respect to the same, and means for preventing the inner edges of the guard plates from spreading with respect to the inner rim and felly of the wheel.

LOUIS P. BROTHERTON.

Witnesses:
WILLIAM O. ANDREWS,
CHAS. O. P. SMITH.

Copies of this patent may be obtained for five cents each, by addressing the "Commissioner of Patents, Washington, D. C."